United States Patent [19]

Kraus

[11] Patent Number: 4,964,312

[45] Date of Patent: Oct. 23, 1990

[54] INFINITELY VARIABLE TRACTION ROLLER TRANSMISSION

[75] Inventor: Charles E. Kraus, Austin, Tex.

[73] Assignee: Excelermatic Inc., Austin, Tex.

[21] Appl. No.: 259,043

[22] Filed: Oct. 17, 1988

[51] Int. Cl.$^5$ .............................................. F16H 13/10
[52] U.S. Cl. ....................................... 74/199; 74/200; 74/212
[58] Field of Search .......................... 74/212, 200, 199

[56] References Cited

U.S. PATENT DOCUMENTS

| | | | |
|---|---|---|---|
| 3,486,391 | 12/1969 | Kraus | 74/200 |
| 4,086,820 | 5/1978 | Kraus et al. | 74/200 |
| 4,693,134 | 9/1987 | Kraus | 74/200 |
| 4,702,118 | 10/1987 | Kraus | 74/200 |
| 4,858,484 | 8/1989 | Kraus | 74/200 |
| 4,885,955 | 12/1989 | Kraus | 74/199 |

FOREIGN PATENT DOCUMENTS

| | | | |
|---|---|---|---|
| 817984 | 10/1951 | Fed. Rep. of Germany | 74/200 |
| 580189 | 10/1924 | France | 74/200 |
| 58-160664 | 9/1983 | Japan | 74/200 |
| 61-27359 | 2/1986 | Japan | 74/200 |
| 191979 | 3/1967 | U.S.S.R. | 74/200 |
| 476589 | 12/1937 | United Kingdom | 74/200 |

*Primary Examiner*—Leslie A. Braun
*Assistant Examiner*—Scott Anchell

[57] ABSTRACT

In a infinitely variable transmission wherein two toric traction discs are rotatably supported in a housing opposite one another so as to define therebetween a toric cavity in which at least two motion transmitting traction rollers are disposed in engagement with the toric discs and supported by pivot trunnions, each pivot trunnion is provided with a single support roller disposed on a track section and has an axial control end which is supported so as to be slightly movable in a plane normal to the axis of the toric discs and means are provided for controllably moving the trunnion control ends in unison for initiation of a transmission ratio change.

7 Claims, 6 Drawing Sheets

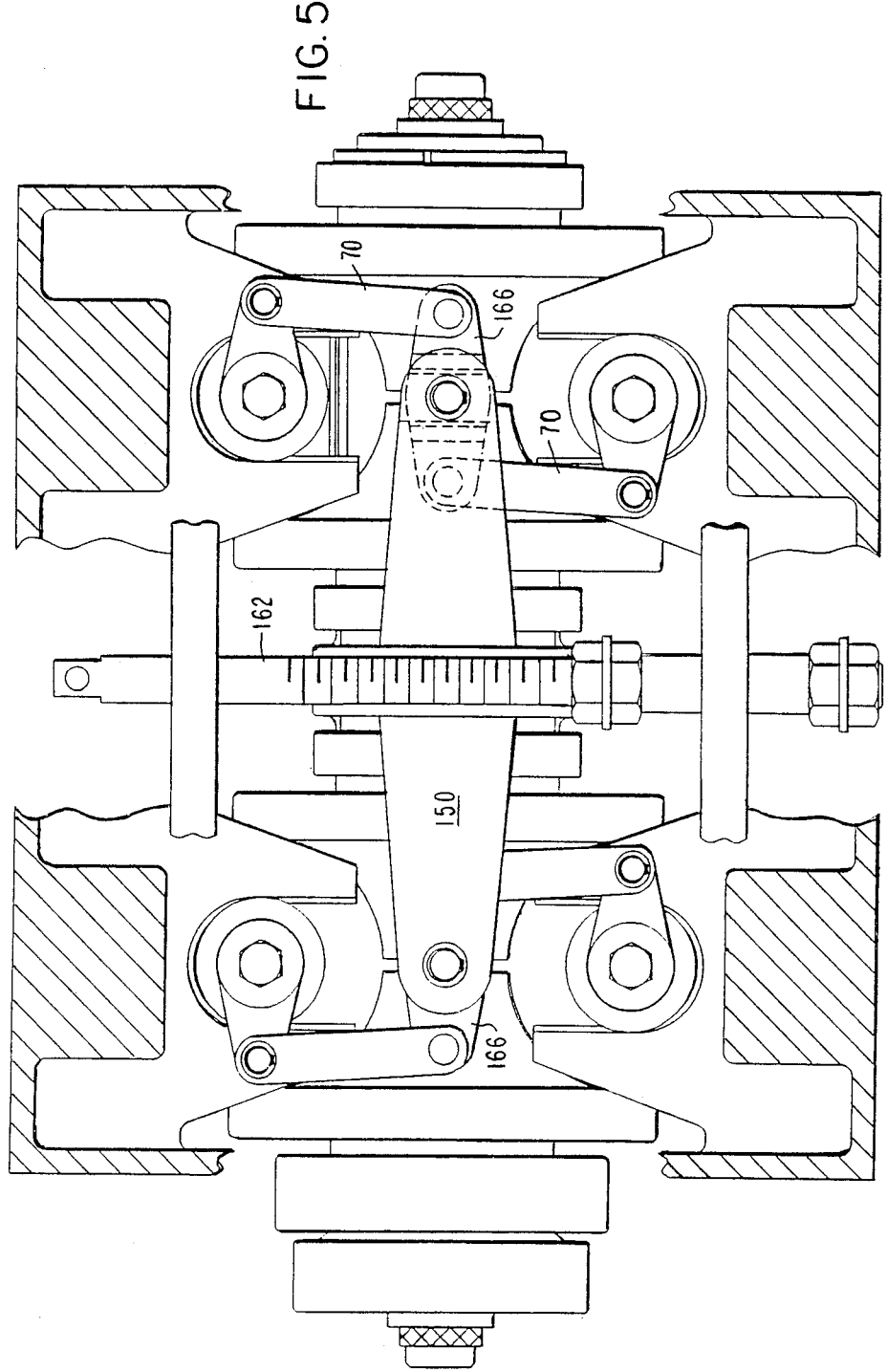

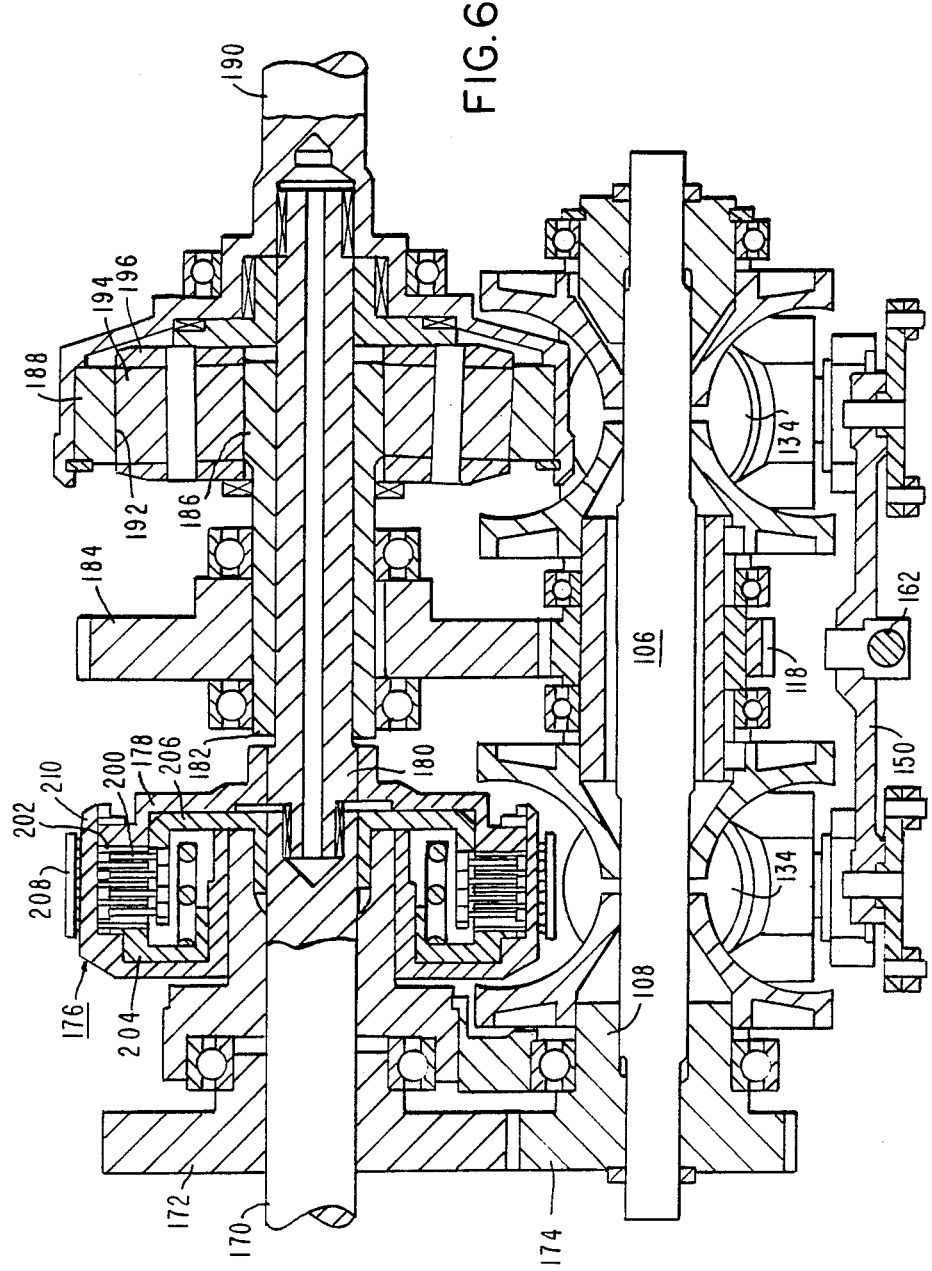

INFINITELY VARIABLE TRACTION ROLLER TRANSMISSION

BACKGROUND OF THE INVENTION

The invention relates to an infinitely variable traction roller transmission in which power is transmitted through traction rollers pivotally supported in a housing between toric input and output discs.

In such transmissions, the traction rollers are mounted on support structure which, when pivoted, cause engagement of the traction rollers with the toric discs in circles of varying diameters depending on the desired transmission ratio. The pivotal traction roller support structures are so supported that they can be moved axially for initiating a change in the transmission ratio. For example, two traction rollers may be supported opposite one another by flexible tension sheets as shown in U.S. Pat. No. 4,086,820 which issued May 2, 1978 to Charles E. Kraus.

In the arrangement according to the present inventor's U.S. Pat. No. 4,702,118, the traction roller support members are pivotally supported with respect to the transmission housing by means of antifriction bearing segments which are disposed at opposite ends of the support members and directly mounted on the housing. Such bearing segments however are quite expensive and therefore the arrangement as a whole becomes too expensive for small transmissions.

In applicant's U.S. Pat. No. 4,858,484 in which two traction rollers are arranged between, and in engagement with, opposite toric traction discs for the transmission of motion therebetween, each traction roller is supported by a pivotal support trunnion which has support rollers disposed at opposite end thereof and supported on partial circular tracks disposed on the housing's inner surface for direct trunnion support. The traction rollers are supported on the pivot trunnions by force transmitting means which, for inexpensive transmissions, include stacks of Belleville springs. The housing tracks may have a center of curvature which is slightly off-set with regard to the pivot axis of the trunnions in order to provide greater compression of the Belleville spring, that is, greater disc engagement forces in one pivotal end position of the pivot trunnions than in their opposite pivotal end positions.

Such support structure is relatively inexpensive and yet with the arrangement with displaced support track the engagement forces applied to the traction rollers by the traction roller support structure depend on the pivot position of the traction roller support trunnion such that—depending on the use of the transmission—they are relatively high in one pivot end position and relatively low in the opposite pivot end position. The arrangement, although relatively simple and inexpensive, still requires a high pressure fluid source and high pressure operating cylinders and pistons for transmission ratio control and although the high pressure control structures are relatively simple they were the cause of a amount of operational difficulties and furthermore they require a special high pressure fluid pump since operating fluids of similarly high pressures are generally not available.

It is therefore the object of the present invention to provide a relatively simple infinitely variable traction roller transmission which can be operated without hydraulic operating means or with only low pressure hydraulic operating mechanisms.

SUMMARY OF THE INVENTION

This is achieved by providing in an infinitely variable transmission which has two toric traction discs rotatably supported in a housing opposite one another so as to define therebetween a toric cavity in which at least two motion transmitting traction rollers are disposed in radial symmetry in engagement with the toric discs and supported by pivot trunnions, a single support roller for each trunnion which is received in a partial circular track section mounted in the housing for forcing the trunnion and the associated traction roller into firm engagement with the toric discs for permitting transmission of motion therebetween and supporting an axially projecting control end of each trunnion so as to be slightly movable in a plane normal to the axis of the toric discs, the control ends of the trunnions having means associated therewith for tilting the trunnions in unison in said plane for the initiation of a transmission ratio change.

SHORT DESCRIPTION OF THE DRAWINGS

FIG. 5 shows the transmission ratio control arrangement for the transmission of FIG. 4; and FIG. 6 is a cross-sectional view taken along line VI—VI of FIG. 4.

DESCRIPTION OF A PREFERRED EMBODIMENT

Figure 1:
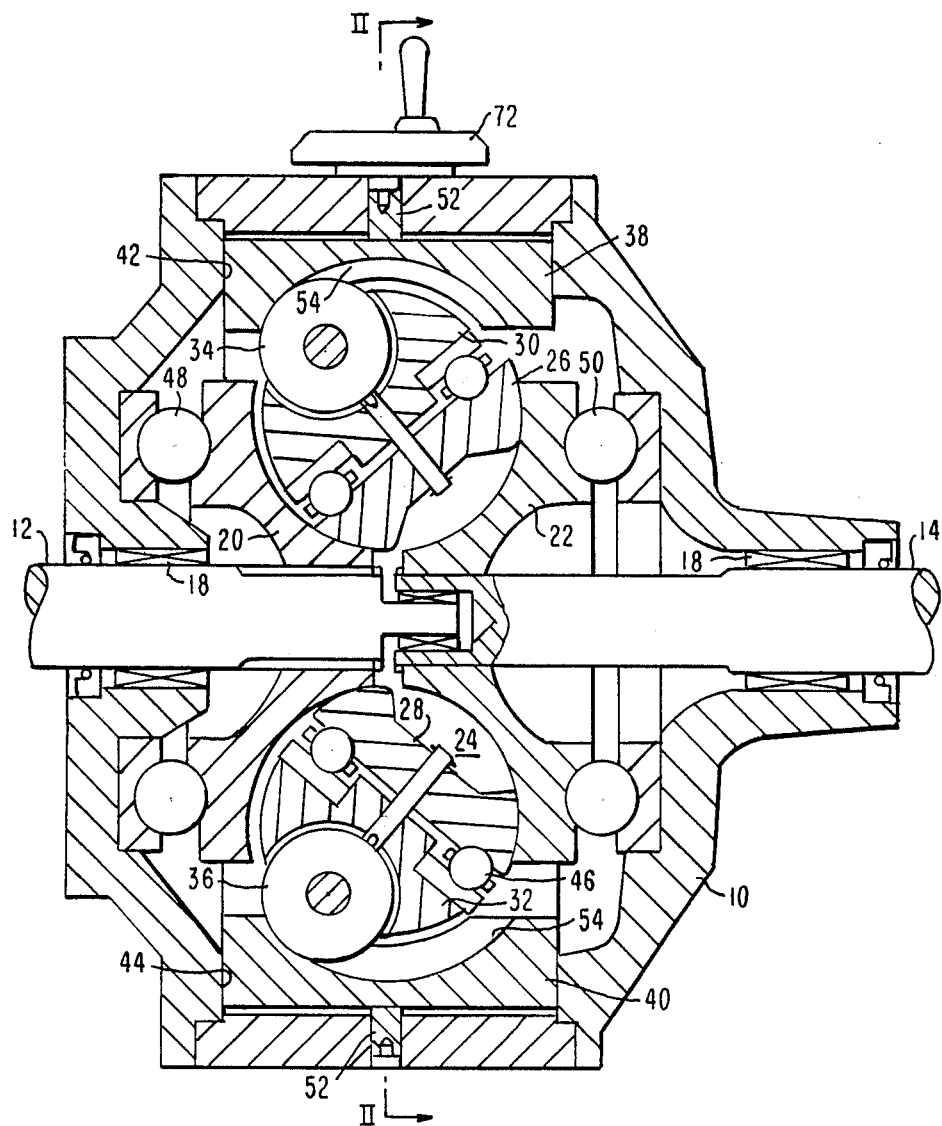
FIG. 1 is an axial cross-sectional view of the traction roller transmission.

A simple traction roller transmission as shown in FIG. 1 consists of a housing 10 having coaxial input and output shafts 12, 14 rotatably supported therein by bearings 16 and 18. Associated with the input and output shafts 12, 14 are toric discs 20, 22 which are so arranged opposite one another that a toric cavity 24 of circular cross-section is defined therebetween. Within the toric cavity 24 traction rollers 26, 28 are rotatably supported in engagement with the toric traction discs 20, 22. The traction rollers 26, 28 are supported in the housing 10 by pivot trunnions 30 and 32 which are pivotally supported directly on the housing walls by way of trunnion rollers 34 and 36 running on hard metal track members 38, 40 received in track cavities 42, 44 formed in the housing 10. Each of the pivot trunnions 30, 32 carries a traction roller bearing 46 for rotatably supporting the associated traction rollers 26, 28 which are forced into firm engagement with the traction discs 20 and 22 by way of the trunnion rollers 34, 36, the traction discs 20 and 22 being axially supported by axial thrust bearings 48 and 50. The engagement forces of the traction rollers 26, 28 with the toric traction discs 20, 22 depend on the loading applied by the track members 38, 40 which are adjustably mounted by preload adjustment screws 52. The circular support grooves 54 in the track members 38, 40 may be slightly eccentric with respect to the center circle of curvature of the toric cavity 24 in order to provide larger contact forces for the traction rollers in one pivotal end position of the pivot trunnions 30 and 32, specifically, in the position for lowest output shaft speed and highest output shaft torque as shown in FIG. 1.

Figure 2:
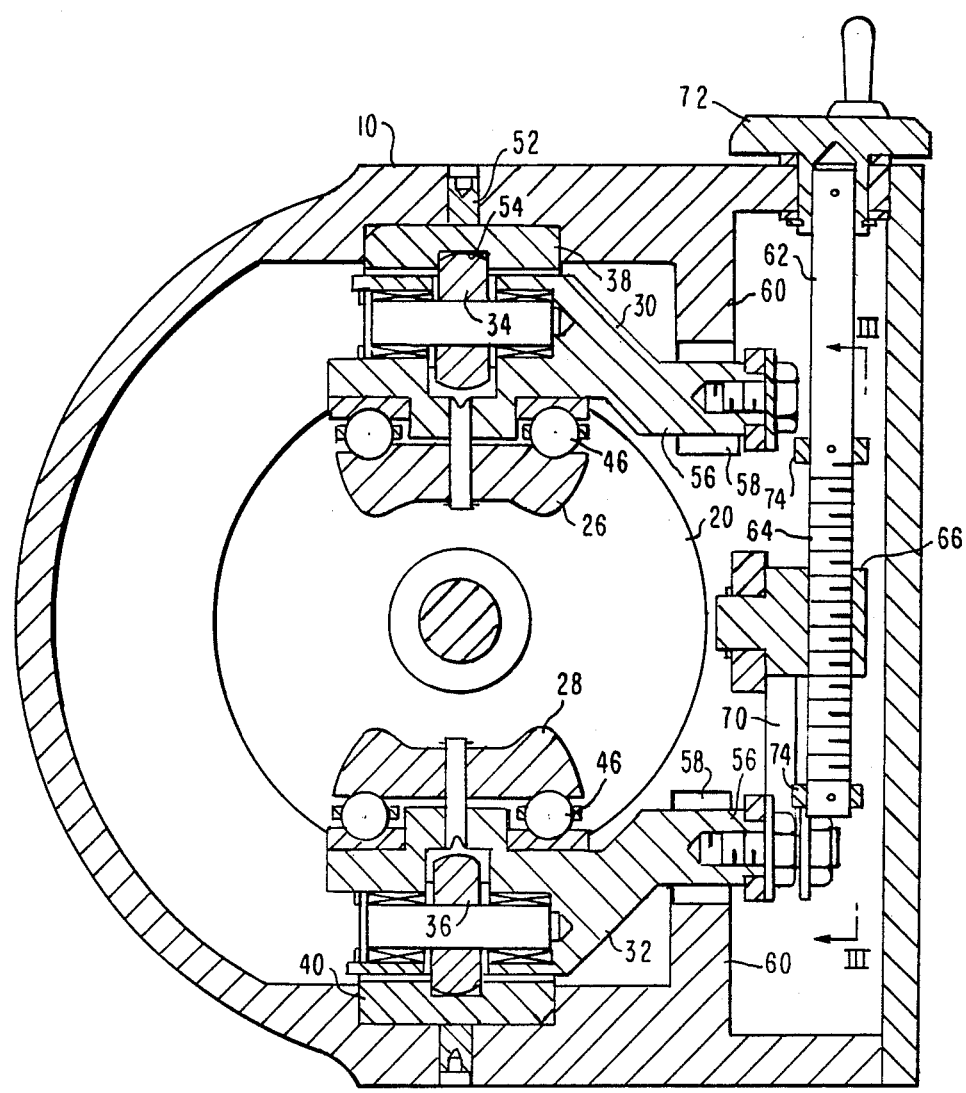
FIG. 2 is a cross-sectional view along line II—II of FIG. 1.

FIG. 2 shows the support arrangement for the pivot trunnions 30 and 32 which at their control ends 56 are engaged slidably in a direction along the length of the grooves 58 slidably engaged by appropriate grooves 58 formed in inwardly projecting housing wall portions 60 to permit tilting of the trunnions 30, 32 about the points of support of the trunnions rollers 34, 36 on the track members 38, 40. They are held in position by a ratio control rod or screw 62 supported in the housing 10 and provided with a threaded portion 64 carrying an adjustment member 66 to which the ends 56 of the pivot trunnions 30 and 32 are linked as shown clearly in FIG. 3.

The pivot trunnion ends 56 have precess arms 68 mounted thereon so as to project radially in opposite directions with respect to the pivot axes of the trunnions and the axis of the control rod 62. The ends of the precess arms 68 are linked to the oppositely projecting ends of the adjusting member 66 by links 70.

The transmission ratio can be controlled with this arrangement in a simple manner: Rotating the control rod 62 by way of a hand wheel 72, for example, causes the adjusting member 66 to move axially on the threaded portion 64 and, by way of links 70 provides for tilting of the pivot trunnions 30 and 32 and the traction rollers 26 28 out of an inactive non-procession position in which the transmission ratio remains unchanged into a precesing position with respect to the toric discs 20, 22. The processing position causes the traction rollers 26, 28 to walk to different circles of engagement with the toric discs 20, 22, to a larger circle of engagement with one and a smaller circle of engagement with the other, thereby pivoting the pivot trunnions 30 and 32 while changing the transmission ratio. As the ends of the precess arms 68 are held by the links 70 pivoting of the pivot trunnions results in the ends 56 of the pivot trunnions sliding back to their non-precessing position while the desired transmission ratio change is accomplished. Stop members 74 may be provided on the control shaft which determine the pivot end positions of the pivot trunnions, that is, the transmission ratio limits.

Figure 3:
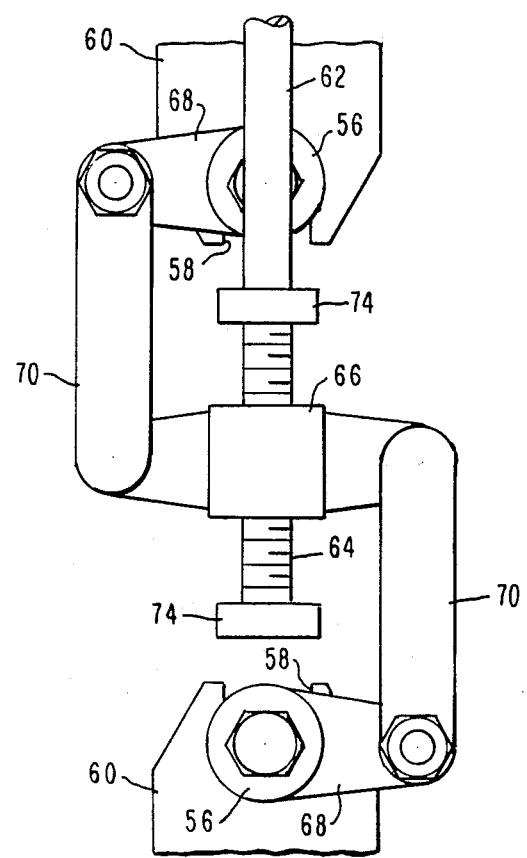
FIG. 3 is a view along line III—III of FIG. 2 showing the ratio control mechanism.
Figure 4:
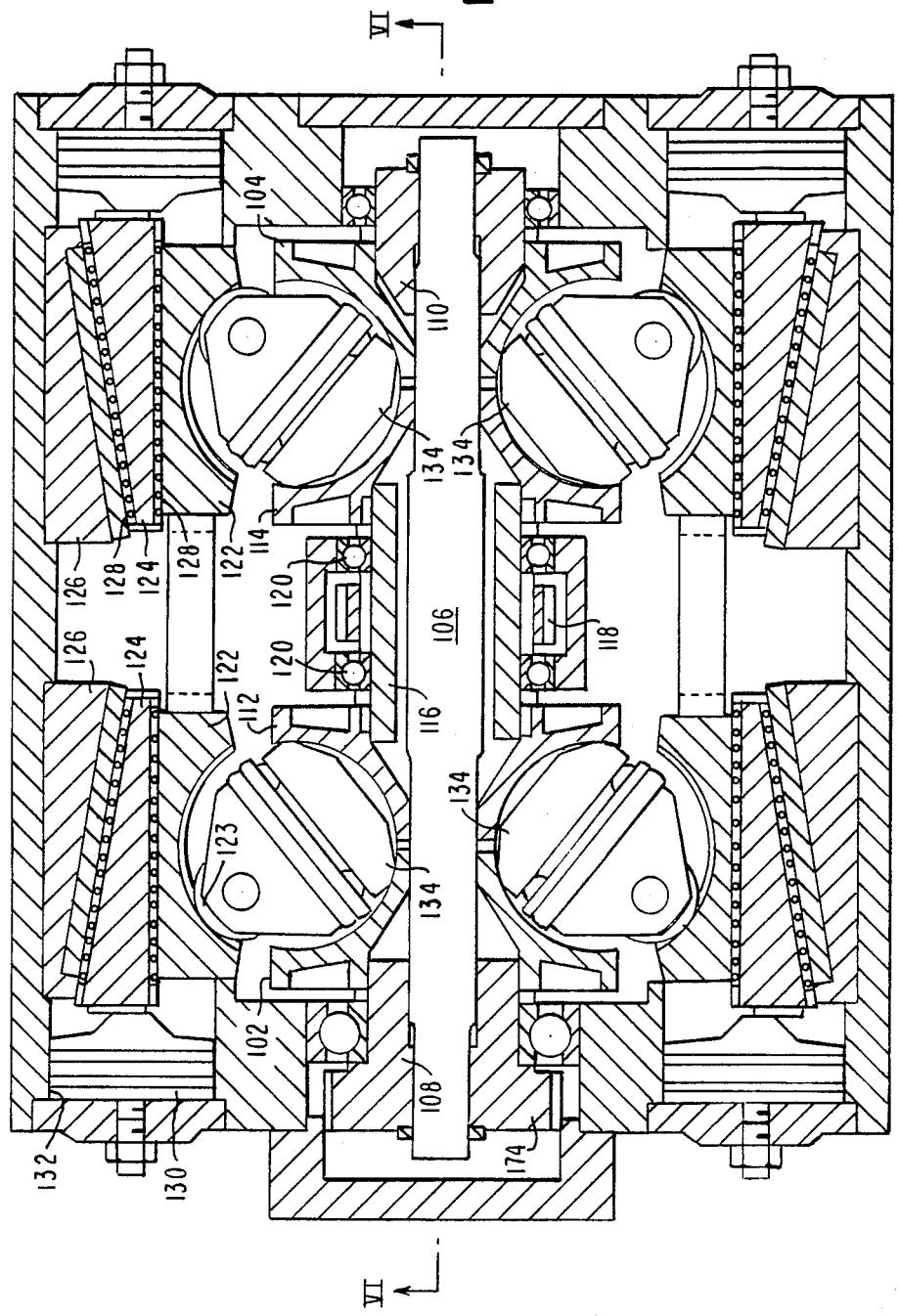
FIG. 4 shows a traction roller transmission with a twin toric disc arrangement.

The arrangement disclosed with regard to FIGS. 1 to 3 is a simple mechanical arrangement which is therefore inexpensive and reliable. However arrangements capable of transmitting substantially more power are feasible with relatively little more complicated arrangements, for example, as shown in FIG. 4. Here, twin traction roller structures are utilized for higher power transmissions and in order to avoid the need for heavy and expensive axial thrust bearings for the toric discs. In the arrangement shown in FIG. 4 only the structure necessary for an understanding of the particular embodiment will be described: The two outer toric discs 102 and 104 are firmly mounted on the main transmission shaft 106 by way of mounting sleeves 108 and 110, the sleeve 108 being provided with a gear structure to be driven thereby. The inner discs 112 and 114 are mounted on a hollow transmission shaft 116 through which the main transmission shaft 106 extends and which carries an output gear 118, the hollow transmission shaft 116 being supported by bearings 120. The metal track members 122 for the traction roller turnnion rollers 123 are provided with an adjustable backup structure including a wedge 124 disposed on an inclined backup plate 126 and including needle bearing structures 128 to facilitate wedging movement. Pistons 130 disposed in cylinders 132 abut the wedge for hydraulic operation of the wedges so as to provide the required contact forces between the traction rollers 134 and the disc 102, 104 and 112, 114. In this manner the hydraulic fluid pressure necessary for operating the pistons 130 is only relatively low which eliminates the need for high presure fluid pumps and high pressure piston seals. Also jerky motions are not directly applied to the pistons.

As shown in FIG. 5, the transmission ratio control arrangement is essentially the same as the one shown in FIG. 3 for a single-unit traction roller transmission. The operating mecahnisms for the two toric disc structures are attached to the opposite ends of an operating arm 150 to which the individual adjustment members 166 are mounted so that they are movable in unison by the operating arm and the mechanism for moving the operating arm 150. As shown in FIG. 5 this mechanism consists of a threaded rod 162 but it may also be a hydraulic mechanism.

FIG. 6 is a cross-sectional view along line VI—VI of FIG. 4 which cross-sectional view gives a full view of the transmission mechanism. The figure does not show the housing since it is not needed for an understanding. FIG. 6 shows the transmission input shaft 170 which at its outer end carries an input gear 172 which is in engagement with the gear structure 174 on the sleeve 108 of FIG.4. At its inner end the input shaft 170 is provided with a clutching structure 176 which includes a clutch bell 178 mounted on one end of an intermediate shaft 180 which extends through a hollow transmission shaft 182. The hollow transmission shaft 182 carries a gear 184 which is in engagement with the gear 118 mounted on the hollow traction roller transmission shaft 116 and which is driven thereby at a relative speed, variable depending on the ratio setting of pivotal traction rollers 134. The hollow transmission shaft 182 is provided at its end with a sun roller structure 186 which forms the center roller of a planetary type traction roller transmission of the type disclosed in applicant's patent application Ser. No. 07/188,132.

The planetary type traction roller transmission includes a traction ring 188 which is mounted for rotation with the transmission output shaft 190 and has a race 192 spaced from the surface of the sun roller 186 with planetary rollers 194 being disposed in the annular space beteen the traction ring 188 and the sun roller 186. The planetary rollers 194 are supported by a carrier 196 which is firmly mounted on the other end of the intermediate shaft 180. The planetary roller carrier 196 is either rotated together with the input shaft 170 (forward) or it is held non-rotatable (for reverse) under the control of the clutch structure 176. If the clutch plates 200 and 202 are engaged by the hydraulic piston 204 the intermediate transmission shaft 180 is operatively connected to the clutch plate support member 206 which is mounted on the input shaft 170 so that the intermediate shaft 180 and the planetary traction roller carrier rotate with the input shaft for forward rotation of the output shaft 190. If however the clutch plates 200 and 202 are disengaged and the reverse brake band 208 engages the carrier 210 for the clutch plates 202, which carrier is connected with the clutch bell 178, the intermediate shaft 180 is locked and so is the planetary traction roller carrier 196 which then provides for reverse rotation of the ring 188 and the output shaft 190.

The arrangement as shown in FIG. 6 makes apparent how space-efficient the arrangement actually is. It is seen that the clutch structure 176 extends into the otherwise unused toric space defined between the toric discs of one set of toric transmission discs and the planetary traction roller ring 188 extends into the toric space defined between the toric discs of the other set of toric transmission discs so that the distance between the two sets of shafts and also the transmission volume are only relatively small. FIG. 6 also shows the ratio control mechanism for the two toric traction roller transmission structures wherein, as also shown in FIG. 5, one operating arm 150 has its opposite ends connected to the two ratio control mechanisms for concurrent operation thereof, the operating arm 150 being movable by the rod 162. The rod 162 may be movable by mechanical means or it may be operable by hydraulic means such as a hydraulic cylinder and piston structure which preferably is large enough such that its operating fluid pressure requirements are essentially the same as those of the operating pistons and cylinders 130, 132 for the wedges 124.

Other variations of the arrangement according to the present invention are possible: For example, in order to facilitate tilting of the pivot trunnions 32 the support rollers 36 may be slightly curved in axial direction as shown in FIG. 2 or, although a planetary type traction roller transmission is shown, a gear type pnaletary transmission may be utilized.

What is claimed is:

1. An infinitely variable traction roller transmission comprising: a housing; two toric traction discs rotatably supported in said housing, one for rotation with an input shaft and the other for rotation with an output shaft, said toric discs having opposite traction surfaces defining therebetween a toric cavity of circular cross-section; at least two motion transmitting traction rollers arranged in said toric cavity in radial symmetry and in engagement with said toric discs for the transmission of motion therebetween, each of said traction rollers being rotatably supported in said housing by a pivot trunnion adapted to pivot about a control axis which is essentially tangential to the center circle of said toric cavity, each of said pivot trunnions having a support roller mounted thereon and a partial circular track structured arranged adjacent each pivot trunnion and supporting the support roller thereof, said track structures being adapted to force the traction rollers on said pivot trunnions into force transmittin engagement with said toric discs, each of said trunnions having a control end projecting along said control axis and being pivotally supported in said housing such that said control end is additionally movable in a plane normal to the axis of said toric discs for tilting said trunnion about the point of support of said support roller on said partial circular track structure; and means for supporting and controllably tilting said trunnions in unison in said plane in the same angular sense with respect to the axis of the toric discs so as to provide for precess motion of said traction rollers for initiation of a transmission ratio change.

2. A traction roller transmision according to claim 1, wherein said housing has inwardly projecting wall portions provided with guide slots through which said trunnion ends project and in which they are slidably supported.

3. A traction roller transmission according to claim 2, wherein said means for tilting said trunnions include arms mounted on said trunnion ends so as to project in directions essentially normal to a plane receiving the pivot axis of said trunnions and the axis of the traction roller supported on the respective trunnion and means connected to said arms for tilting said trunnions.

4. A traction roller transmission according to claim 3, wherein said trunnion ends are projecting in the same direction and said arms project from said trunnion ends in parallel fashion in opposite directions and wherein said means connected to said arms are links cconnected to a common operating member, said operating member having an operating mechanism associated therewith for setting the transmission ratio.

5. A traction roller transmission according to claim 4, wherein said operating member has a threaded passage with a threaded operating rod received therein and supprted in said housing so as to be rotatable for moving said operating member along said operating rod.

6. A traction roller transmission according to claim 1, wherein said trunnion support rollers have axially curved outer surface areas so as to facilitate tilting of said trunnions.

7. A traction roller transmission according to claim 1, wherein said track structure adjacent each pivot trunnion is supported on a wedge and a hydraulic cylinder and piston arrangement is provided adjacent each wedge for forcing said wedges into wedge spaces adjacent said pivot trunnions for forcing the traction rollers on said pivot trunnions into firm engagement with the associated toric discs.

* * * * *